Figure 1:
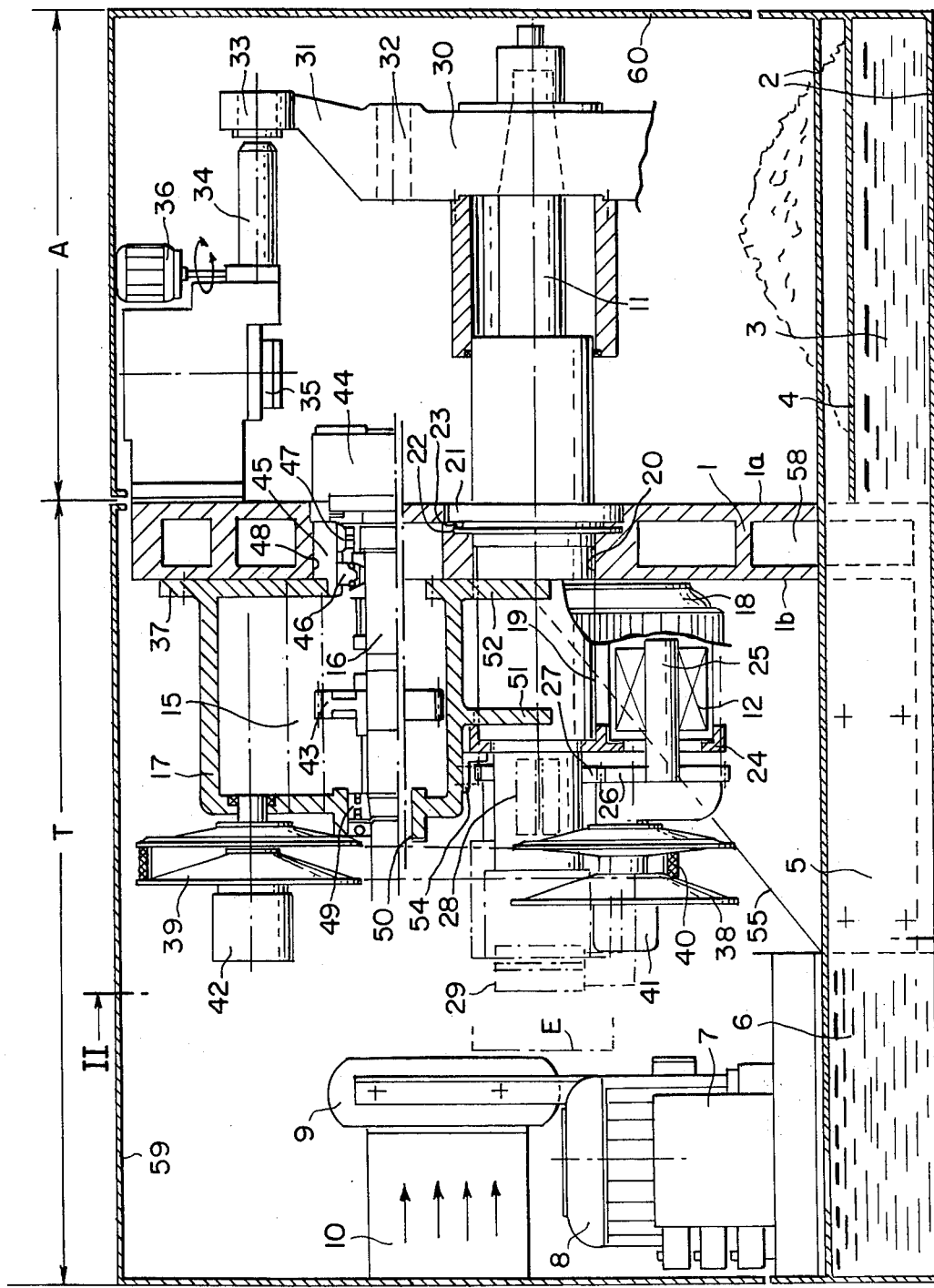

United States Patent [19]
Van der Horst

[11] 4,120,219
[45] Oct. 17, 1978

[54] TURNING MACHINE TOOL

[75] Inventor: Eberhard Van der Horst, Erkelenz, Germany

[73] Assignee: A. Monforts, Mönchengladbach, Germany

[21] Appl. No.: 813,332

[22] Filed: Jul. 6, 1977

[30] Foreign Application Priority Data

Jul. 6, 1976 [DE] Fed. Rep. of Germany ....... 2630248

[51] Int. Cl.² .................. B23B 3/00; B23B 19/02; B23B 17/00
[52] U.S. Cl. .................. 82/2 R; 82/28 R; 82/30; 82/32
[58] Field of Search .......... 82/2 R, 2 E, 28 R, 30, 82/32

[56] References Cited

U.S. PATENT DOCUMENTS

| | | | |
|---|---|---|---|
| 1,673,088 | 6/1928 | Potter | 82/32 |
| 2,028,727 | 1/1936 | Perry et al. | 82/32 |
| 3,387,515 | 6/1968 | George | 82/2 R |
| 3,620,109 | 11/1971 | Dorr et al. | 82/2 E |
| 3,800,636 | 4/1974 | Zagar | 82/32 |
| 4,058,033 | 11/1977 | Lahm | 82/2 R |

*Primary Examiner*—Harrison L. Hinson
*Attorney, Agent, or Firm*—Herbert L. Lerner

[57] ABSTRACT

A turning machine tool having a workpiece spindle and a tool turret shaft extending parallel thereto and including a transmission and drive means, a single free-standing front plate for supporting and bearing the spindle and the turret shaft, the front plate having a front side at which the transmission and the drive means are mounted, the transmission having a housing and the spindle and the turret shaft being supported in bearing parts, the transmission housing and the spindle and turret-shaft bearing parts being mutually braced at a spacing from the rear side of the front plate so that in the working space at the front side of the front plate, coordination of a workpiece placed on the spindle to the tools of the turret, is stabilized.

6 Claims, 2 Drawing Figures

TURNING MACHINE TOOL

The invention relates to a turning machine tool such as a lathe with a workpiece spindle and a tool turret shaft extending parallel thereto and supported in a front plate of the machine, the working space being located on the front side of the front plate, while the transmission as well as the drives are located on the rear side of the front plate.

Lathes of this type have heretofore had a housing which was generally cast. The drive mechanism with the main drive, the transmission and the turret turning motor as well as parts of the hydraulic system and other components were located in the interior of the housing. The turret shaft and generally also the spindle were supported in the front plate of the housing and, additionally, in the rear wall of the housing opposite the front plate, as disclosed, for example, in German Patent DT-PS 865,090. Such machine tools with a tool turret which is mounted usually overhung or cantilevered, have proven themselves for decades because of their extraordinary stability. The heretofore employed, rather expensive housing was considered to be necessary, although the walls thereof impeded accessibility to the components contained in the housing. It was a further disadvantage that the relatively large housing barely afforded an economical encapsulation of the drive and hydraulic portions of the machine (amongst other things, for the purpose of noise suppression) because such an encapsulation would not only have occupied too large a space but would have decreased the accessibility of the encapsulated components even more.

It is accordingly an object of the invention to provide a turning machine tool for metal machining, especially an automatic lathe, which avoids the foregoing disadvantages and provides many improvements over conventional turning machine tools or lathes.

It is a further object of the invention, to provide such a turning machine tool, wherein the accessibility of the drive, transmission and hydraulic parts is considerably improved over the heretofore known machine tools of this general type.

It is another object of the invention to provide such a turning machine tool, the assembly of which is simplified due to the fact that subassemblies thereof and, in particular, the drive mechanism thereof, can be prefabricated and tested in modular form and assembled in that condition.

It is an added object of the invention to provide such a turning machine tool wherein, in spite of the compact disposition of the components, the turning machine tool is easier to install and maintain. In view of the tendency to reduce the cost and overall length of such a turning machine tool it is yet another object of the invention to permit certain parts of the housing to be eliminated, which have heretofore been considered to be absolutely indispensable.

It is yet a further feature of the invention to provide such a turning machine tool wherein the entire drive portion of the machine tool can be encapsulated in such a manner that the accessibility of the drive portions is preserved in spite of the encapsulation, and the encapsulation per se requires only an economically justifiable outlay of money and space.

Among other things, the invention is based upon the discovery that the turret shaft can be supported exclusively by the front plate of the machine frame. It was further recognized that an additional support or bearing for the turret shaft in the rear wall of the machine housing which was considered to be essential heretofore provides virtually no increased stability of the machine. This also applies to the heretofore conventional support or bearing for the workpiece spindle in the front plate and rear wall of the machine tool housing.

With the foregoing and other objects in view, there is provided in accordance with the invention, in a turning machine tool having a workpiece spindle and a tool turret shaft extending thereto and including a transmission and drive means, a single free-standing front plate for supporting and bearing the spindle and the turret shaft, the front plate having a front side at which a working space is provided and a rear side on which the transmission and the drive means are mounted, the transmission having a housing, and the spindle and the turret shaft being supported in bearing parts, the transmission housing and the spindle and turret-shaft bearing parts being mutually braced at a spacing from the rear side of the front plate so that, in the working space at the front side of the front plate, coordination of a workpiece placed on the spindle to the tools of the turret, is stabilized.

In accordance with another feature of the invention, the spindle housing forms a housing in common for the transmission, the housing being prefabricated and flanged to the rear side of the front plate. Moreover, the turret shaft has a guide bushing adjustable relative to the position of the turret shaft and the spindle and spaced from the rear side of the front plate, the guide bushing being threadedly secured and pinned to the spindle-transmission housing. The spindle head, upon which the workpiece-chuck is to be placed, is inserted through an opening formed in the front plate within which the spindle is to be supported in bearings for rotation about the longitudinal axis thereof. The turret shaft is advantageously supported in the guide bushing which passes through the front plate.

A major achievement of the invention is that, first of all, the housing of the turning machine tool is essentially eliminated except for the front plate. This improves the assemblability and accessibility of the drive portion of the machine tool quite considerably over the prior state of the art. Since the workpiece spindle and the tool turret shaft remain, furthermore, supported only in the region of the front plate, and the heretofore employed, second and rear bearing as well as the housing wherein it is received is eliminated, the overall length of the machine tool is shortened. The elimination of this housing and the diminished overall length of the drive portion of the machine tool make it possible to provide, in accordance with an additional feature of the invention, a flappingly operable, sound-absorbing encapsulation surrounding the entire drive, transmission and bearing parts of the machine tool. Since, due to the elimination of the housing, the components within the encapsulation are readily or conveniently mountable or assemblable and accessible, the encapsulation also offers no interference to installation or maintenance if it is flappingly swingable in order to be opened, for example, like the hood of a motor vehicle.

A particularly advantageous application of the invention is found in a turret lathe with a turret shaft which is disposed below or alongside and parallel to the spindle, and having a turret head disposed on the turret shaft so as to overhang the same; the turret head being movable in longitudinal direction during operation of the machine tool, and having a locking device which also serves as a guide device and is located outside the pitch circle for the tool holder of the turret, as disclosed in German Patent DT-PS 906,165. In such a machine tool, a guide hole formed in the turret head, especially in a turret arm, is associated with each operating position of the turret, an indexing pin which locks and guides the turret head and which is rigidly connected to the machine tool frame, and, therefore, to the front plate, being receivable in this hole during operation of the turning machine tool. In such a machine tool, the relationship between the workpiece and the tool in the working space is stabilized not only by the front plate and the components mounted on the rear side thereof but also by the turret head and the indexing pin.

Since a considerable part of the components of the machine tool according to the invention is mounted on the substantially freestanding front plate of the machine, it is advantageous, in accordance with added features of the invention, to provide the base frame of the machine tool, to which the front plate is connected, with a very heavy mass, in order to shift the center of gravity of the whole system to as low a position as possible. The base frame is filled, for example, with concrete partially mixed with scrap metal. As is customary, it is also advantageous to construct the base frame of the machine below the working space as a so-called water tray to receive the chips as well as the coolant sprayed onto the turning tool bit and onto the workpiece during the turning operation.

Since a great part of the components of the turning machine tool or lathe are suspended from both sides of the front plate, the latter should, of course, have adequate stability. Surprisingly, however, the stability requirements are relatively low, since the relationship between the workpieces placed on the spindle and the tools or tool bits is already stabilized by the mutually braced system of the frames and bearings of the transmission, the spindle and the turret shaft. In case of slight instability of the front plate, all parts of the working space will normally move or vibrate together as if a conventional turning machine tool or lathe were disposed as a whole upon an oscillating or rocking foundation. Provision must therefore be made primarily to insure that the front plate does not topple or tip over. This is achieved in accordance with a concomitant feature of the invention, by providing at least one bracing member at the rear side of the front plate for maintaining the front plate in a vertical position relative to the base frame. The front plate per se may be formed of solid massive iron (cast iron) or steel. To reduce the weight of the front plate, it may be advisable, however, to use a relatively thin front plate, on the surface of which, preferably on the rear side thereof, reinforcement ribs are provided. A similar result i.e., weight reduction, can be achieved by using a cast plate with cavaties formed therein.

Other features which are considered as characteristic for the invention are set forth in the appended claims.

Although the invention is illustrated and described herein as embodied in a turning machine tool, it is nevertheless not intended to be limited to the details shown, since various modifications and structural changes may be made therein without departing from the spirit of the invention and within the scope and range of equivalents of the claims.

Figure 2:
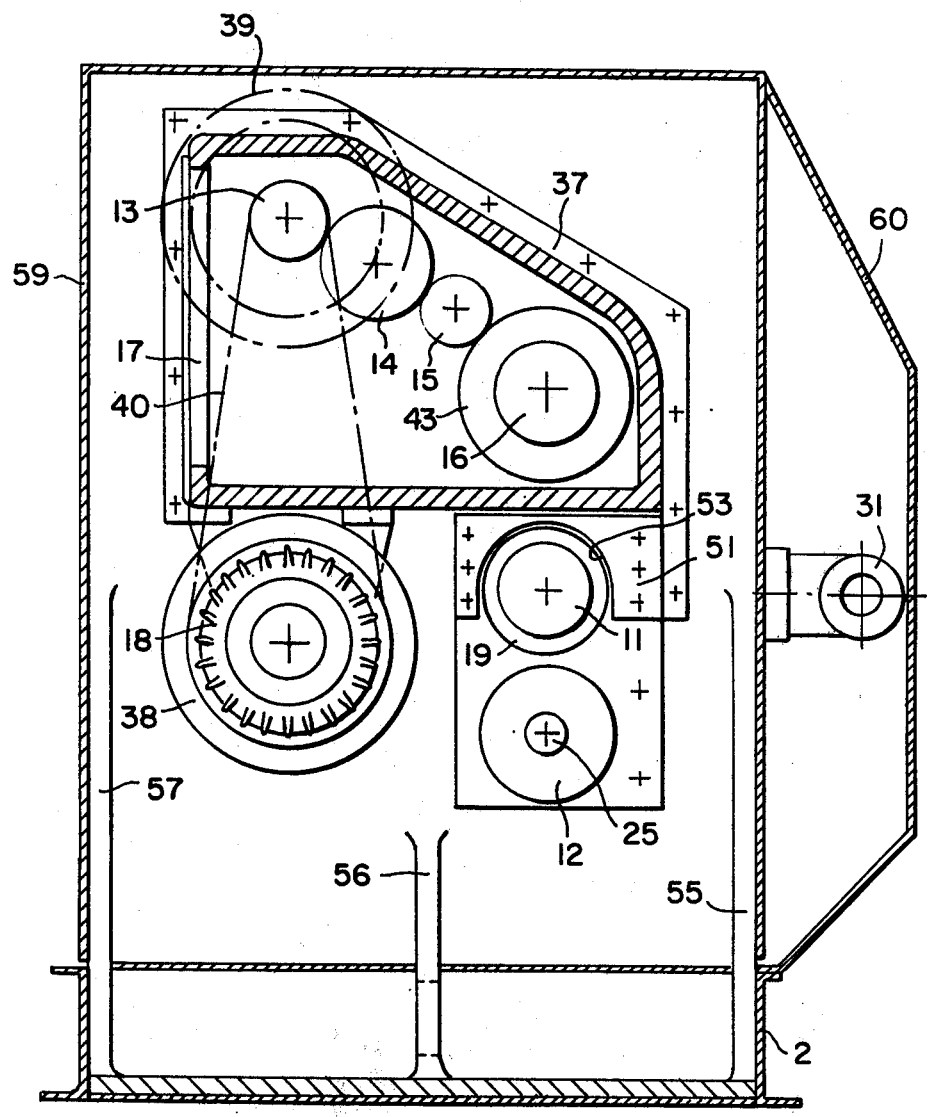

The construction and method of operation of the invention, however, together with additional objects and advantages thereof will be best understood from the following description of specific embodiments when read in connection with the accompanying drawings, in which:

FIG. 1 is a longitudinal sectional view of the lathe or turning machine according to the invention; and FIG. 2 is a cross sectional view taken along the line II—II of FIG. 1 in the direction of the arrows.

Referring now to the drawing, there is shown in FIGS. 1 and 2, a front plate 1 which stands vertically on a base frame 2. The front side 1a of the front plate 1 i.e., on the right-hand side of FIG. 1, is associated with a working space A of the machine tool. A drive mechanism T of the lathe or machine tool is located on the left-hand side of FIG. 1 behind the front plate i.e., adjacent the rear side 1b of the latter. In conventional machines, this drive mechanism was enclosed by a housing which was generally formed of cast iron. According to the invention, this housing is eliminated up to the front plate 1 i.e., up to the front side 1a thereof.

preferably, the base frame 2 is formed primarily of three parts. A water tray 3 for receiving the water sprayed onto the toolpiece and the workpiece during the turning operation is provided beneath the working space A. Advantageously, a horizontal screen or sieve 4 is inserted into the upper region of the water tray 3 to receive thereon the chips or turnings produced during the turning operation. In FIG. 1, to the left-hand side of the upright front plate 1, the base frame 2 is preferably filled with a heavy mass 5. This may consist of concrete in which scrap metal is embedded. The heavy mass serves to shift the center of gravity of the system downwardly and to damp vibrations of the machine tool. At the rearward end of the base frame 2 (entirely to the left-hand side of FIG. 1), an oil tank 6 is provided. Above the oil tank 6, an hydraulic control unit 7 and a drive motor 8 of an hydraulic pump set of the machine are disposed adjacent one another. Above them, an oil cooler 10 is located, fastened to a mounting support or fixture 9.

In or at the rear side of the front plate 1, as shown in FIG. 1, two subassemblies are mounted. According to FIGS. 1 and 2, these subassemblies are the turret shaft 11 with the associated turning or shifting motor 12, on the one hand, and on the other hand, the spindle-drive housing 17 which, in the illustrated embodiment, contains the transmission with transmission parts 13 to 15 and the spindle 16 of the machine tool, with the associated main motor 18 of the machine tool flanged thereto.

The turret shaft 11 is supported in a guide bushing 19, which simultaneously fulfills the function of a feed cylinder. The feed cylinder, is constructed, for example, in accordance with the German Patent DT-PS 865,090, within the guide bushing 19 and serves to reciprocate the turret shaft 11 in the longitudinal or axial direction thereof during the operation of the machine tool.

The guide bushing 19 is held rigidly in an opening 20 (preferably a bore hole) of the front plate 1 and is bolted thereto by means of a flange 21 countersunk in the front plate 1. In bolting the flange 21 to the front plate 1, the guide bushing 19 and the turret shaft 11 mounted therein have been aligned exactly parallel to the spindle 16. This alignment of the turret shaft 11 relative to the spindle 16 can be achieved by having the contact surface 22 of the flange 21 scrape in or abrade the front plate 1 until the correct adjustment is obtained. It is also advantageous, however, to form radial incisions 23 in the flange 21. In this way, when the flange 21 and the front plate 1 are bolted together, the guide bushing 19 and, therewith, the turret shaft 11 may be finely aligned, as desired, relatively to the spindle 16 by more or less tightly compressing the incisions 23 after the contact surface 22 has previously been roughly or grossly adjusted.

A connecting plate 24 is mounted on the end of the guide bushing 19 at a distance from the rear side 1b of the front plate 1. The connecting plate 24 receives, in a lower region thereof, the shifting or turning motor 12 which is associated with the turret shaft 11. A gear 26 is mounted on the output or drive end of the shaft 25 of the shifting or turning motor 12. Another gear 27, which surrounds the turret shaft 11 and is rigidly connected to the latter, meshes with the gear 26 if the turret shaft is fully extended to the right-hand side as viewed in FIG. 1. By actuating the shifting or turning motor 12, the turret shaft can then be rotated to the next desired shift or turning position by means of the gears 26 and 27. An hydraulic actuating cylinder is preferably used as the shifting or turning motor 12. Terminal switches 28 and 29 represented diagrammatically in phantom are provided at the rearward end of the turret shaft 11 for respectively switching the shaft or turning positions and the feed motions of the turret shaft 11.

A tool turret 30 having, for example, four turret arms 31 is mounted in overhung or cantilever fashion and rigidly seated on the free end of the turret shaft 11. As a rule, tool-holder holes 32, which are aligned with the axis of the workpiece spindle 16 are provided in the turret arms 31. At the free end of each turret arm 31, there is further provided a guide hole 33, wherein an indexing pin 34, which locks and guides the turret 30, engages during the operation of the machine tool. In operation, the turret 30 travels from the end position thereof according to FIG. 1 toward the left-hand side in such a manner that the non-illustrated tools thereof come into engagement with the workpiece placed into the chuck 44. The rearward end of the turret shaft 11 thus travels approximately to the dash-dot line E. The indexing pin 34 is connected either directly or by means of a planar slide or support to the front plate 1. For exact adjustment as well as for a dimensional correction of the machine, the indexing pin 34 may be adjustable to a slight extend perpendicularly to the axial or longitudinal direction thereof. Suitable adjusting means 36 and forms of the indexing pin per se are described in the German Patent DT-PS 1,287,901 as well as in German Published Non-Prosecuted Applications DT-OS 2,255,647, 2,446,127, 2,526,855 and 2,613,302.

According to FIG. 2, a spindle-transmission housing 17 is bolted to the rear side 1b of the front plate 1 by means of a flange 37. Within the housing 17, is a two-stage transmission with shafts 13, 14 and 15, that is provided for driving the spindle 16, as seen in FIG. 2. The input or driving side of the transmission is connected to the main motor 18 by means of a variable flat-belt drive. According to FIGS. 1 and 2, the variable flat-belt drive is formed of respective pairs of control pulleys 38 and 39. The flat belt 40 runs on these pairs of control pulleys 38 and 39. The pair of control pulleys 38 is mounted on the output or driven shaft of the main motor 18. The pair of control pulleys 39 is connected to the input or driving shaft 13 of the transmission. The mutual spacing of the control pulleys of the control pulley pair 38 is controllable by means of a diagrammatically indicated driving device 41. The latter is actuatable by means of a control bar or through terminal switches 29 which are represented in phantom. In contrast, the control pulleys of the control pulley pair 39 can be pressed together by the force of a spring 42. If the spacing of the control pulleys of the control pulley pair 38 is varied, the belt 40 is caused to travel radially inwardly or outwardly. Due to the resultant decreasing or increasing of the tension in the flat belt 40, the pulleys of the control pulley pair 39 are thereupon pushed together or moved apart elastically by the spring force 42.

The output shaft 15 of the transmission mounted in the spindle transmission housing 17 meshes with a gear 43 which surrounds the spindle 16 and is rigidly connected thereto. In this manner, the spindle 16 is drivable by the main motor 18 at the desired speed by means of the flat-belt variable-speed drive and the transmission. The spindle 16 per se is supported in a bushing 45 on a double-row conical or inclined ball bearing 46 and a double-row cylindrical roller bearing 47 at the forward end of the spindle 16, which is provided for receiving the workpiece chuck 44. The bushing 45 which is inserted into a receiving hole 48 of the front plate 1, is rigidly connectible to the spindle-transmission housing 17. The spindle-transmission housing 17 is thereby insertable in completely pre-assembled condition with all bearing parts into the front plate 1. To assemble, it is then only necessary to bolt the flange 37 of the housing 17 to the front plate 1 and, subsequently, to place the chuck 44 onto the spindle head. Another part of the bearing support for the spindle 16 is a play-free double-row cylindrical roller bearing 49, by means of which the spindle 16 is supported in a receiving hole 50 of the spindle-transmission housing 17. The bearings of the spindle 16 are preferably prestressed. In lieu of these bearings, conical roller bearings are also usable at both ends of the spindle.

At the underside of the spindle-transmission housing 17, massive or solid plates 51 and 52 are provided. The plate 52 is, in essence, an extension of the flange 37 and serves to connect the housing 17 to the rear side 1b of the front plate over as large an area as possible. In both plates 51 and 52, cutouts 53 are provided which extend partly around the guide bushing 19 of the turret shaft 11. According to the invention, the connecting plate 24, which surrounds the end of the guide bushing 19 and carries the shifting motor 18 at the lower end thereof, is firmly bolted to the massive plate 51. It is advisable to effect the threaded connection between the heavy plate 51 and the connecting plate 24 only when the turret shaft 11 or the guide bushing 19 thereof is aligned or oriented in the required manner relative to the spindle 16. In lieu of, or in addition to, the plate 51, an angle 54 can be attached to the upper end of the connecting plate 24; after the turret shaft 11 has been oriented relative to the spindle 16, this angle 54 is threadedly secured and pinned to the underside of the housing 17.

Regardless of the type of selected rigid connection of the spindle-transmission housing 17, which contains the spindle 16 in prestressed bearings, to the turret shaft 11 or its guide bushing 19, after the position of the turret shaft 11 is set and adjusted relative to the spindle 16, a completely rigid mutual bracing of the spindle 16 and the turret shaft 11 spaced from the rear side 1b of the front plate 1 is thus obtained. Therefore, although according to the invention, only a single front plate 1 supports the spindle 16 and the turret shaft 11, a stable relationship is nevertheless obtained for the system of the turret shaft 11 and the spindle 16 during the operation of the machine tool, so that very accurate turning or lathe work can be performed. If for any reason the front plate 1 should experience slight vibrations, the system consisting of the turret shaft 11 and the spindle 16 remains unaffected thereby, since this system is stabilized in itself not only by the front plate 1, but also by the spindle-transmission housing 17 and by the connection of the latter, spaced from the rear side 1b of the front plate 1. In addition thereto, this system is also stabilized by means of the turret shaft 11, the turret arm 31 and the indexing pin 34.

Even if slight movements of the front plate have no appreciable or disturbing influence upon the turning accuracy of the machine tool, it is nevertheless necessary generally to maintain the front plate 1 in upright position, through the use of additional means such as one or more braces 55 to 57 besides supporting it directly at the base frame 2. The front plate 1 itself may be formed of heavy steel or iron. To reduce the weight and to save material, however, it is generally advisable to use a front plate which has reinforcement or stabilizing ribs, preferably on the rear side 1b thereof. It may also be advantageous to use a front plate formed with cavities or hollow cores 58 (as shown).

In the exemplary embodiment of the invention, the base frame 2 has an overall length of 3,300 mm (FIG. 1) and a width of 1,140 mm. The front plate 1 provided with the cavities 58 is about 140 mm thick and 1,800 mm high. The spacing between the center of the spindle 16 and the center of the turret shaft 11 is 320 mm. Approximations of the other dimensions are readily obtainable by comparison with the approximately true-to-scale drawing according to FIGS. 1 and 2.

It is a particular advantage of the machine tool according to the invention that the entire drive unit can be surrounded by an encapsulation 59. This encapsulation 59 may either be removable or can be hingedly flappable sidewise or upwardly. The encapsulation can be constructed as a double shell in such a manner that a sound-absorbing medium, such as sand, for example, is insertable between the shells of the encapsulation 59.

Since the turret shaft 11 is not located in the center of the machine in the illustrated embodiment of the invention, one laterally disposed turret arm 31 always extends beyond the base frame 2. According to FIG. 2, the enclosure 60 of the working space is therefore made with an appropriate projection. It is advisable, however, to retract the lower part of the enclosure 60 near the boundary thereof with the base frame 2, as shown, thereby providing clearance for the operator to step close to the machine tool or the working space A without stubbing his toes.

There are claimed:

1. In a turning machine tool having a workpiece spindle and a tool turret shaft extending parallel thereto and including a transmission and drive means, a single free-standing front plate for supporting and bearing the spindle and the turret shaft, said front plate having a front side at which a working space is provided and a rear side on which the transmission and the drive means are mounted, the transmission having a housing and the spindle and the turret shaft being supported in bearing parts, said transmission housing and said spindle and turret-shaft bearing parts being mutually braced at a spacing from said rear side of said front plate so that, in said working space at said front side of said front plate, coordination of a workpiece placed on the spindle to the tools of the turret, is stabilized.

2. Turning machine tool according to claim 1 wherein said spindle housing forms a housing in common for said transmission, said housing being flanged to said rear side of said front plate, the turret shaft having a guide bushing adjustable relative to the position of the turret shaft and the spindle and spaced from said rear side of said front plate, said guide bushing being threadedly secured and pinned to said spindle-transmission housing.

3. Turning machine tool according to claim 1 including a flappingly openable, sound-absorbing encapsulation surrounding the entire drive, transmission and bearing parts of the machine tool.

4. Turning machine tool according to claim 1 having a base frame, said front plate being rigidly connected to a heavy mass in said base frame.

5. Turning machine tool according to claim 4 wherein said heavy mass is formed of a mixture of metal scrap and concrete.

6. Turning machine tool according to claim 1 having a base frame, and including at least one bracing member, at said rear side of said front plate, for maintaining said front plate in a vertical position relative to the base frame.

* * * * *